US012605918B2

(12) United States Patent
Kim et al.

(10) Patent No.: US 12,605,918 B2
(45) Date of Patent: Apr. 21, 2026

(54) COMPOSITE INSULATING MATERIAL COMPRISING SUPER ABSORBENT POLYMER LAYER

(71) Applicant: LG Chem, Ltd., Seoul (KR)

(72) Inventors: Jong Hun Kim, Daejeon (KR); Jae Hoon Choi, Daejeon (KR); Chang Song Lee, Daejeon (KR); Yong Jin Kim, Daejeon (KR); Kyoung Shil Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 233 days.

(21) Appl. No.: 18/681,195

(22) PCT Filed: Jun. 1, 2023

(86) PCT No.: PCT/KR2023/007507
§ 371 (c)(1),
(2) Date: Feb. 5, 2024

(87) PCT Pub. No.: WO2024/014707
PCT Pub. Date: Jan. 18, 2024

(65) Prior Publication Data
US 2024/0278528 A1 Aug. 22, 2024

(30) Foreign Application Priority Data
Jul. 12, 2022 (KR) ........................ 10-2022-0085835

(51) Int. Cl.
*B32B 5/24* (2006.01)
*B32B 5/02* (2006.01)
(Continued)

(52) U.S. Cl.
CPC .................. *B32B 5/24* (2013.01); *B32B 5/02* (2013.01); *B32B 5/16* (2013.01); *B32B 5/30* (2013.01);
(Continued)

(58) Field of Classification Search
CPC .... B32B 5/24; B32B 5/02; B32B 5/16; B32B 5/30; B32B 7/02; B32B 2250/40;
(Continued)

(56) References Cited

U.S. PATENT DOCUMENTS

2003/0127108 A1* 7/2003 Policicchio ............... B08B 1/14
134/6
2006/0125158 A1 6/2006 Rouanet et al.
(Continued)

FOREIGN PATENT DOCUMENTS

CN 106554189 A 4/2017
CN 113388299 A 9/2021
(Continued)

OTHER PUBLICATIONS ip.com translation of KR-20090097747-A (Year: 2025).*
(Continued)

*Primary Examiner* — Michael Zhang
(74) *Attorney, Agent, or Firm* — Lerner David LLP

(57) ABSTRACT
A composite insulating material includes two or more blankets, each having a substrate for a blanket and aerogel formed on the inside and a surface of the substrate for the blanket, and a super absorbent polymer layer including super absorbent polymer particles located between the blankets.

10 Claims, 1 Drawing Sheet

(51) Int. Cl.

| | | |
|---|---|---|
| *B32B 5/16* | (2006.01) | |
| *B32B 5/30* | (2006.01) | |
| *B32B 7/02* | (2019.01) | |

(52) U.S. Cl.

CPC ............ *B32B 7/02* (2013.01); *B32B 2250/40* (2013.01); *B32B 2260/021* (2013.01); *B32B 2260/04* (2013.01); *B32B 2262/101* (2013.01); *B32B 2264/0214* (2013.01); *B32B 2264/303* (2020.08); *B32B 2266/057* (2016.11); *B32B 2266/126* (2016.11); *B32B 2307/302* (2013.01); *B32B 2307/304* (2013.01); *B32B 2307/718* (2013.01); *B32B 2307/726* (2013.01); *B32B 2307/7376* (2023.05)

(58) Field of Classification Search

CPC .......... B32B 2260/021; B32B 2260/04; B32B 2262/101; B32B 2264/0214; B32B 2264/303; B32B 2266/057; B32B 2266/126; B32B 2307/302; B32B 2307/304; B32B 2307/718; B32B 2307/726; B32B 2307/7376; B32B 2250/42; B32B 2307/73; B32B 5/245; B32B 5/266; B32B 17/02; B32B 5/18; B32B 27/065; B32B 27/18; B32B 27/308; B32B 27/32; B32B 2307/72; B32B 2309/105; F16L 59/029

See application file for complete search history.

(56) References Cited

U.S. PATENT DOCUMENTS

| | | | |
|---|---|---|---|
| 2006/0263587 A1 | 11/2006 | Ou et al. | |
| 2011/0252739 A1 | 10/2011 | Leeser et al. | |
| 2018/0009969 A1 | 1/2018 | Kim et al. | |
| 2018/0134566 A1 | 5/2018 | Kim et al. | |
| 2018/0264793 A1 | 9/2018 | Kim et al. | |
| 2018/0370211 A1 | 12/2018 | Gupta et al. | |

| | | | |
|---|---|---|---|
| 2019/0010060 A1 | 1/2019 | Oh et al. | |
| 2020/0215791 A1 | 7/2020 | Oh et al. | |
| 2021/0114887 A1 | 4/2021 | Oh et al. | |

FOREIGN PATENT DOCUMENTS

| | | | | | |
|---|---|---|---|---|---|
| CN | 114103332 A | | 3/2022 | | |
| JP | S63230785 A | | 9/1988 | | |
| JP | H0197632 A | | 4/1989 | | |
| JP | H0424336 U | | 2/1992 | | |
| JP | H06042582 U | | 6/1994 | | |
| JP | H06328604 A | | 11/1994 | | |
| JP | 3018438 U | | 11/1995 | | |
| JP | 2000263680 A | | 9/2000 | | |
| JP | 2018527220 A | | 9/2018 | | |
| JP | 2019501850 A | | 1/2019 | | |
| KR | 20070052269 A | | 5/2007 | | |
| KR | 20070100738 A | | 10/2007 | | |
| KR | 20090097747 A | * | 9/2009 | ............ | C04B 16/12 |
| KR | 101232111 B1 | | 2/2013 | | |
| KR | 101454233 B1 | | 10/2014 | | |
| KR | 20150005753 A | | 1/2015 | | |
| KR | 20160120202 A | | 10/2016 | | |
| KR | 101684508 B1 | | 12/2016 | | |
| KR | 20170096928 A | | 8/2017 | | |
| KR | 20180036747 A | | 4/2018 | | |
| KR | 20190056138 A | | 5/2019 | | |
| KR | 200490186 Y1 | | 10/2019 | | |
| KR | 102194580 B1 | | 12/2020 | | |
| WO | WO-2018221987 A1 | * | 12/2018 | ............ | B32B 15/04 |

OTHER PUBLICATIONS

Extended European Search Report for Application No. 23839801.0 dated Dec. 2, 2024, 7 pgs.

Yoo, S.Y. and Kim, T.H., "A Study on the Effects of Water Absorption on the Thermal Conductivity of Insulation Materials," Korean Journal of Air-Conditioning and Refrigeration Engineering, vol. 25 No. 3, Mar. 2013, pp. 119-125 (English Abstract Only).

International Search Report for PCT/KR2023/007507 mailed Sep. 14, 2023. 4 pages.

\* cited by examiner

FIG. 1(a)
FIG. 1(b)
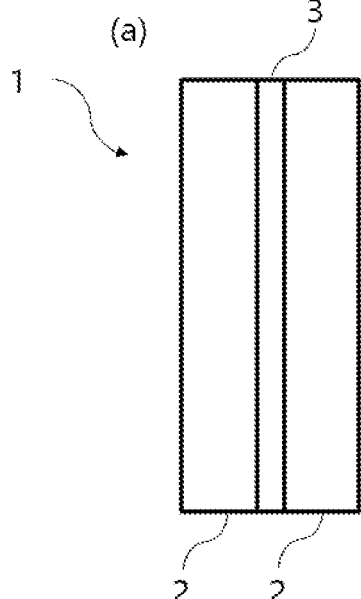
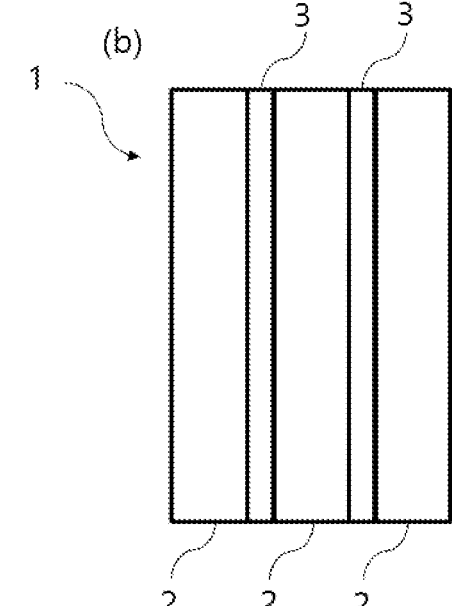

COMPOSITE INSULATING MATERIAL COMPRISING SUPER ABSORBENT POLYMER LAYER

CROSS-REFERENCE TO RELATED APPLICATIONS

The present application is a national phase entry under 35 U.S.C. § 371 of International Application No. PCT/KR2023/007507 filed on Jun. 1, 2023, which claims priority from Korean Patent Application No. 10-2022-0085835, filed on Jul. 12, 2022, the entire contents of which are incorporated herein by reference.

TECHNICAL FIELD

The present disclosure relates to a composite insulating material, and more particularly, to a composite insulating material having improved insulation performance by including a super absorbent polymer layer (SAP layer) between blankets, which are insulating materials.

BACKGROUND ART

Aerogel is a highly porous material having a porosity of about 90 to 99.9% and a pore size from 1 to 100 nm. Aerogel is used for a high efficiency insulating material because it has a high porosity, a specific surface area, and super-insulation performance that exhibits lower thermal conductivity than a conventional organic insulating material of Styrofoam.

The aerogel is produced by impregnating a substrate for a blanket with a catalyzed sol and allowing gelation to proceed. In the case of the aerogel, such as silica aerogel, moisture in the air is adsorbed to a surface of the blanket by a hydrophilic silanol group present on the surface and penetrates into the inside, such that thermal conduction of the blanket increases due to the moisture. As a result, the insulation performance is decreased.

In order to solve the above problem, the hydrophilicity of the surface of the aerogel is modified to be hydrophobic. However, when the surface is exposed to moisture for a long time, the problem of the decrease in the insulation performance persists.

Therefore, there is a need for a method capable of minimizing the decrease in the insulation performance of the blanket even when moisture penetrates the blanket.

Technical Problem

In order to solve the problems mentioned in the background art, an object of the present disclosure is to provide a composite insulating material having improved insulation performance by including a super absorbent polymer layer between blankets because the space between blankets risks an increase in thermal conduction due to moisture.

Technical Solution

In one embodiment, a composite insulating material includes: two or more blankets each including a substrate for a blanket and aerogel formed on the inside and a surface of the substrate for a blanket and a super absorbent polymer layer located between the two or more blankets and including super absorbent polymer particles.

Advantageous Effects

According to the composite insulating material of the present disclosure, the super absorbent polymer particles included in the super absorbent polymer layer located between the blankets absorb moisture in the air. With this property, moisture in the air to that would have otherwise penetrated the blanket is absorbed in advance, such that the insulation effect may be maximized. In addition, even when moisture has already penetrated the blanket, low thermal conductivity of the composite insulating material itself may be maintained by absorbing the moisture.

In addition, since the super absorbent polymer particles have a property of swelling when absorbing moisture, the super absorbent polymer particles may function to protect the blanket from moisture by absorbing moisture and then swelling. This property may act as a protective film to prevent moisture from moving deeper into the composite insulating material.

BRIEF DESCRIPTION OF THE DRAWINGS

FIGS. 1(a) and 1(b) are cross-sectional views of a composite insulating material according to an exemplary embodiment of the present disclosure.

DETAILED DESCRIPTION

The terms and words used in the description and claims of the present disclosure are not to be construed or limited to a general or dictionary meanings but are to be construed in view of the present disclosure, based on a principle that the inventors are able to appropriately define the concepts of terms in order to describe their own disclosure in the best mode.

Hereinafter, the present invention will be described in more detail in order to assist in the understanding of the present invention.

A composite insulating material according to an exemplary embodiment of the present disclosure may include: two or more blankets each including a substrate for a blanket and aerogel formed on the inside and a surface of the substrate for a blanket; and a super absorbent polymer layer located between the two or more blankets and including super absorbent polymer particles.

In the two or more blankets, the substrate for a blanket included in the blanket may be specifically a porous substrate to improve the insulation performance of the blanket. When the substrate for a blanket is a porous substrate, it is easy for a catalyzed sol to form an aerogel on the inside and the surface of the substrate for a blanket to penetrate the surface of the substrate for a blanket and then inside the substrate for a blanket. Therefore, aerogel may be uniformly formed to the inside of the substrate for a blanket, and through this, the insulation effect of the blanket and the composite insulating material including the same may be maximized.

The substrate for a blanket may be a film, a sheet, a net, a fiber matrix, a non-woven fabric, or a laminate of two or more layers thereof. In addition, a surface thereof may have a surface roughness or may be patterned depending on the use. More specifically, the substrate for a blanket may be a fiber matrix capable of further improving insulation performance by including pores through which aerogel is easily inserted.

Specifically, the substrate for a blanket may be polyamide, polybenzimidazole, polyaramid, an acrylic resin, a phenolic resin, polyester, polyether ether ketone (PEEK), a polyolefin (for example, polyethylene, polypropylene, or a copolymer thereof), cellulose, carbon, cotton, wool, hemp, a non-woven fabric, a glass fiber, or ceramic wool. More specifically, the substrate for a blanket of the present disclosure may include glass felt (glass fiber) suitable for an insulating material due to low thermal conductivity.

The blanket according to an exemplary embodiment of the present disclosure may include aerogel formed on the inside and the surface of the substrate for a blanket. The aerogel may be formed on the substrate for a blanket, that is, pores formed of glass fibers, and the pore may be a space formed due to a three-dimensional matrix structure of the glass fibers. Meanwhile, the aerogel formed on the inside and the surface of the substrate for a blanket may refer to an aggregate of aerogel combined with the substrate for a blanket. Specifically, the aerogel formed on the surface of the substrate for a blanket means a state in which a part of the aerogel is exposed on an outer surface of the blanket and is in contact with the air and the like, and the aerogel formed on the inside the substrate for a blanket may refer to aerogel that is not exposed to the outer surface of the blanket while being present inside the blanket.

Furthermore, the blanket including the aerogel formed on the inside and the surface of the substrate for a blanket may be produced by impregnating the substrate for a blanket with a catalyzed sol and allowing gelation to proceed.

First, the catalyzed sol may contain a base catalyst and a sol. The sol is a material that forms a porous gel by a sol-gel reaction, and may include an inorganic sol, an organic sol, or a combination thereof. Specifically, the inorganic sol may include zirconia, yttrium oxide, hafnia, alumina, titania, ceria, silica, magnesium oxide, calcium oxide, magnesium fluoride, calcium fluoride, or a combination thereof. The organic sol may include polyacrylate, polyolefin, polystyrene, polyacrylonitrile, polyurethane, polyimide, polyfurfuryl alcohol, phenol furfuryl alcohol, melamine formaldehyde, resorcinol formaldehyde, cresol formaldehyde, phenol formaldehyde, polyvinyl alcohol dialdehyde, polycyanurate, polyacrylamide, or a combination thereof. More specifically, the sol may include silica sol, which is an inorganic sol with an excellent binding ability to the substrate for a blanket, resulting in a blanket having low thermal conductivity.

Specifically, the silica sol may be prepared by mixing a silica precursor, water, and an organic solvent, and the silica precursor may include a silicon-containing alkoxide-based compound. Specifically, the silica precursor may include tetraalkyl silicates such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate, and more specifically, may include tetraethyl orthosilicate (TEOS).

The silica precursor may be a content of silica ($SiO_2$) included in the silica sol of 3 wt % to 30 wt %. When the content of the silica is less than 3 wt %, the amount of the aerogel formed on the inside and the surface of the substrate for a blanket is excessively low, resulting in a problem in which a desired level of the insulation effect may not be expected. When the content of the silica exceeds 30 wt %, the aerogel is excessively formed, which may cause a decrease in mechanical properties, in particular, flexibility, of the blanket.

In addition, the silica sol may contain an organic solvent and water, and the organic solvent may be one or more of methanol, ethanol, isopropanol, and butanol in terms of compatibility with the silica precursor and water.

Meanwhile, the base catalyst contained in the catalyzed sol is a material that promotes gelation in a gelation step described below by increasing the pH of the sol. The base catalyst may be an inorganic base, such as sodium hydroxide or potassium hydroxide, or an organic base, such as ammonium hydroxide. Specifically, the base catalyst may be sodium hydroxide, ammonia, ammonium hydroxide, or a mixture thereof.

Therefore, the substrate for a blanket may be impregnated with the catalyzed sol. In this case, the impregnation may be performed by adding a catalyzed sol having fluidity into the substrate for a blanket, which may indicate that the catalyzed sol penetrates into pores formed inside and on the surface of the substrate for a blanket.

While the substrate for a blanket is impregnated with the catalyzed silica sol, gelation occurs, and therefore, a wet-gel fiber composite is obtained. The gelation may form a network structure from the catalyzed sol, and the network structure may be a planar network structure in which certain specific polygons having one or more types of atomic arrangements are connected, or a structure that forms a three-dimensional skeleton structure by sharing vertices, edges, and faces of a specific polyhedron.

The gelation may be induced by impregnating the substrate for a blanket with the catalyzed sol and then allowing the impregnated substrate to stand for 0.5 hours to 2.0 hours. The gelation may be performed in a temperature range of 20° C. to 50° C. and preferably performed at room temperature.

Thereafter, the wet-gel fiber composite is allowed to stand at an appropriate temperature to be aged to achieve a chemical change, and the aging may allow the network structure to be formed more firmly, which may enhance the insulation performance of the blanket. The aging may be performed by allowing the wet-gel fiber composite to stand at a temperature of 30° C. to 70° C. for 3 hours to 50 hours.

According to an exemplary embodiment of the present disclosure, an aerogel may be formed on the inside and the surface of the substrate for a blanket by impregnating the substrate for a blanket with the catalyzed sol and then performing gelation and aging. As described above, immediately after the aerogel forms on the inside and the surface of the substrate for a blanket is dried, low thermal conductivity is maintained. However, the aerogel is vulnerable to moisture due to a hydrophilic functional group present on a surface of the aerogel.

A hydroxy functional group present on the surface of the aerogel, such as a hydrophilic silanol group (Si—OH) present on the surface of silica in a silica aerogel, absorbs moisture in the air, and thus, there is a disadvantage that the thermal conductivity gradually increases.

Since the blanket of the present disclosure is used as an insulating material, the above disadvantage may have a fatal effect. Therefore, in order to maintain low thermal conductivity, it is required to modify the surface of the aerogel to be hydrophobic and substitute the hydrophilic functional group present on the surface with a hydrophobic functional group.

In order to modify the surface of the aerogel to be hydrophobic, a surface modifier containing a polar solvent and an organosilane compound may be used. The polar solvent may be methanol, ethanol, or isopropyl alcohol, and the organosilane compound may be trimethylchlorosilane (TMCS), hexamethyldisilazane (HMDS), methyltrimethoxysilane (MTMS), trimethylethoxysilane (TMES), ethyltriethoxysilane (ETES), or phenyltriethoxysilane (PTES), and more specifically, may be trimethylethoxysilane or hexamethyldisilazane.

As described above, the aerogel formed by impregnating the substrate for a blanket with the catalyzed sol and allowing gelation to proceed for surface modification and then dried, such that the aerogel may include a hydrophobic functional group formed on the surface. The silica aerogel according to an exemplary embodiment of the present disclosure has excellent insulation performance by substituting the surface with a hydrophobic functional group, and a silica aerogel-containing blanket may secure low thermal conductivity.

However, although the surface of the aerogel is substituted with a hydrophobic functional group, the thermal conductivity of the blanket may eventually increase due to long-term exposure to moisture, resulting in a decrease in insulation performance. Therefore, as described below, the composite insulating material of the present disclosure is provided with a super absorbent polymer layer, to prevent deterioration of moisture from a decrease in insulation performance of the aerogel.

Meanwhile, the blanket, according to an exemplary embodiment of the present disclosure, may have a deviation in thermal conductivity depending on the location in one blanket of 3.0 mW/m·K or less, and preferably, 2.0 mW/m·K or less or 1.0 mW/m·K or less. In this case, a blanket having a value of 0 without the deviation in thermal conductivity, that is, a blanket having the same thermal conductivity within the blanket, may also be included in the scope of the present disclosure.

In addition, a deviation in thickness of the blanket may be 1.5 mm or less, 1.2 mm or less, or 0.7 mm or less, and preferably, 0.5 mm or less.

The deviation in thermal conductivity or thickness is a feature that may appear in a cut blanket, and specifically, may be a difference between values measured in areas at intervals of 30 cm apart from both ends of an area of 0.01 m$^2$ to 10.0 m$^2$, and more specifically, an area of 0.36 m$^2$ to 5.0 m$^2$.

For example, as for the thermal conductivity and the thickness of the blanket, a plurality of samples having a certain size in the blanket are obtained at predetermined intervals, and then thermal conductivity of each sample is measured at room temperature (23±5° C.) using HFM 436 Lambda equipment available from NETZSCH. The thermal conductivity may be represented by comparing thermal conductivity values measured in areas that are 30 cm apart from both ends in the plurality of samples.

In this case, the number of samples in the blanket may vary depending on the length of the blanket, and may be, for example, 2 to 20, 3 to 10, or 3 to 5.

In addition, according to an exemplary embodiment of the present disclosure, the blanket may include an aerogel and a substrate for a blanket Specifically, aerogel may be formed on the inside and a surface of the substrate for a blanket, or a large amount of aerogel particles may be uniformly formed on the inside and the surface of the substrate for a blanket.

The blanket may have improved thermal conductivity of 10 mW/m·K to 20 mW/m·K. Within this range, the effect of securing the maximum insulation performance of the blanket may be obtained. The thermal conductivity is a value measured at room temperature (23±5° C.) according to a heat flow method using HFM 436 Lambda equipment available from NETZSCH.

The blanket included in the composite insulating material according to an exemplary embodiment of the present disclosure may include aerogel, and for example, in the case of silica aerogel, as described above, there is a disadvantage in that the thermal conductivity gradually increases as a hydrophilic silanol group (Si—OH) present on the surface absorbs moisture in the air. Therefore, in order to maintain low thermal conductivity, in general, the surface of the aerogel is modified to be hydrophobic.

As described above, although the blanket includes silica aerogel having a surface modified to be hydrophobic in order to maintain low thermal conductivity, the insulation effect may not be maximized. This is because a big problem does not occur when the blanket is exposed to moisture for a short time since the aerogel is subjected to hydrophobic treatment, but penetration of moisture due to long-term exposure to moisture eventually causes a decrease in insulation performance of the blanket. As a result, the hydrophobic treatment may not be a fundamental solution to moisture.

Therefore, in the composite insulating material according an exemplary embodiment of the present disclosure, super absorbent polymer layer is located between the blankets so that super absorbent polymer particles included in the super absorbent polymer layer may absorb both moisture in the air and moisture penetrating the blanket. The super absorbent polymer particles may minimize the decrease in the insulation performance of the composite insulating material because it has a property of absorbing moisture around the particles and swelling.

Specifically, the super absorbent polymer particle may contain a crosslinked polymer of a water-soluble ethylenically unsaturated monomer having an acidic group of which at least a part is neutralized, and an internal crosslinking agent. In this case, the water-soluble ethylenically unsaturated monomer may include (meth)acrylic acid or a salt thereof. For example, when acrylic acid and/or an alkali metal salt thereof, such as a sodium salt, is used as the water-soluble ethylenically unsaturated monomer, super absorbent polymer particles having improved absorbency may be obtained.

In addition, examples of the water-soluble ethylenically unsaturated monomer include one or more selected from the group consisting of an anionic monomer, such as maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and a salt thereof; a nonionic hydrophilic monomer, such as (meth)acrylamide, N-substituted (meth)acrylate, 2-hydroxyethyl (meth)acrylate, 2-hydroxypropyl (meth)acrylate, methoxy polyethylene glycol (meth)acrylate, or polyethylene glycol (meth)acrylate; and an amino group-containing unsaturated monomer, such as (N,N)-dimethylaminoethyl (meth)acrylate or (N,N)-dimethylaminopropyl (meth)acrylamide, and a quaternary compound thereof.

Meanwhile, the super absorbent polymer particle may contain a crosslinked polymer crosslinked by the internal crosslinking agent. The internal crosslinking agent may serve to polymerize the water-soluble ethylenically unsaturated monomers described above by crosslinking unsaturated bonds thereof.

The internal crosslinking agent may be a (meth)acrylate-based compound in which a crosslinking reaction proceeds by a free-radical polymerization (FRP) reaction. Specifically, the internal crosslinking agent may be one or more compounds selected from the group consisting of ethylene glycol di(meth)acrylate, polyethylene glycol (meth)acrylate, polyethylene glycol di(meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, and tetraethylene glycol di(meth) acrylate. More specifically, the internal crosslinking agent may be polyethylene glycol di(meth)acrylate.

The crosslinked polymer of the present disclosure may be prepared by the polymerization reaction of the composition containing a water-soluble ethylenically unsaturated monomer, an internal crosslinking agent, and a polymerization initiator. The amount of the internal crosslinking agent in the composition may be 0.01 to 5 parts by weight with respect to 100 parts by weight of the water-soluble ethylenically unsaturated monomer. For example, the amount of the internal crosslinking agent may be 0.01 parts by weight or more, 0.05 parts by weight or more, 0.1 parts by weight, or 0.2 parts by weight or more, and 5 parts by weight or less, 3 parts by weight or less, 2 parts by weight or less, 1 part by weight or less, or 0.5 parts by weight or less, with respect to 100 parts by weight of the water-soluble ethylenically unsaturated monomer. When the content of the internal crosslinking agent is excessively low, crosslinking does not occur sufficiently, which makes it difficult to realize an appropriate level or higher of strength. When the content of the internal crosslinking agent is excessively high, an internal crosslinking density increases, which makes it difficult to realize a desired water retention capacity.

In addition, the super absorbent polymer particle of the present disclosure may have a surface on which a surface crosslinked layer is formed. In this case, the surface crosslinked layer may be crosslinked from a surface crosslinking agent. The surface crosslinking agent may include a polyhydric epoxy compound, which may be a glycidyl ether compound of a polyhydric alcohol.

Specifically, the surface crosslinking agent may include one or more polyhydric epoxy compounds selected from the group consisting of ethyleneglycol diglycidyl ether, diethyleneglycol diglycidyl ether, triethyleneglycol diglycidyl ether, tetraethyleneglycol diglycidyl ether, glycerin polyglycidyl ether, and sorbitol polyglycidyl ether.

The amount of the surface crosslinking agent may be about 0.001 to about 5 parts by weight with respect to 100 parts by weight of a base polymer described below. Specifically, the amount of the surface crosslinking agent may be about 0.005 parts by weight or more, about 0.01 parts by weight or more, or about 0.05 parts by weight or more, and about 4 parts by weight or less, about 2 parts by weight or less, or about 1 part by weight or less, with respect to 100 parts by weight of the base polymer. When the content of the surface crosslinking agent is excessively low, a crosslinking density of the surface crosslinked layer is too low, which may cause a decrease in absorption properties such as absorbency under pressure. When the content of the surface crosslinking agent is excessively high, an excessive surface crosslinking reaction occurs, which may make it difficult to suppress a rewetting phenomenon of the super absorbent polymer particles.

Meanwhile, a particle diameter (D50) of the super absorbent polymer particle included in the composite insulating material of the present disclosure may be 10 to 850 μm. In general, the super absorbent polymer particles are classified into fine particles when the particle diameter is 150 μm or less and normal particles when the particle diameter is more than 150 μm and 850 μm or less. In general, the normal particles are mainly commercialized, but the composite insulating material in the present disclosure is independent of the magnitude of the particle diameter because the properties of the super absorbent polymer particles that absorb moisture and swell on their own are used. Therefore, the super absorbent polymer particles of the present disclosure may further include fine particles in addition to normal particles. The particle diameter may be measured using a laser diffraction method.

A method for preparing the super absorbent polymer particles will be described step-by-step as follows. First, a polymerization reaction of a composition proceeds. As described above, the composition may contain a water-soluble ethylenically unsaturated monomer, an internal crosslinking agent, and a polymerization initiator, and may additionally contain additives such as a thickener, a plasticizer, a storage stabilizer, and an antioxidant, if necessary.

The composition may form a hydrous gel polymer through a polymerization reaction. A step of drying and pulverizing the hydrous gel polymer may include, before drying the hydrous gel polymer, a process of coarsely pulverizing the hydrous gel polymer to increase drying efficiency. The hydrous gel polymer that is subjected to the coarse pulverization process as described above or the hydrous gel polymer immediately after polymerization that is not subjected to the coarse pulverization process may be subjected to drying. Thereafter, a step of preparing a base polymer by pulverizing the dried polymer obtained through the drying step may be performed.

Next, a surface crosslinking reaction step of forming a surface crosslinked layer on at least a portion of a surface of the base polymer in the presence of a surface crosslinking agent is performed. In general, the surface crosslinking agent is applied to the surface of the base polymer. Therefore, the surface crosslinking reaction occurs on the surface of the base polymer, which improves crosslinkability on the surface of the base polymer without substantially affecting the inside of the particle. Accordingly, the surface crosslinked base polymer has a higher degree of crosslinking near the surface than the inside. The surface crosslinking reaction and drying may be simultaneously performed by heating the base polymer to which the surface crosslinking agent is added.

After the surface crosslinking, a step of classifying the base polymer on which the surface crosslinked layer is formed may be followed. The base polymer may be completed into super absorbent polymer particles through processes such as pulverization and classification. Thereafter, the super absorbent polymer particles are classified according to particle diameter, so that super absorbent polymer particles having an appropriate particle diameter according to the purpose of use may be commercialized.

The super absorbent polymer particles may have a centrifuge retention capacity (CRC) of 24 g/g or more, 25 g/g or more, or 26 g/g or more, and 40 g/g or less, 38 g/g or less, or 36 g/g or less, when measured according to EDANA method WSP 241.3.

In addition, the super absorbent polymer particles may have an absorption under pressure (AUP) of 18 g/g or more, 20 g/g or more, or 22 g/g or more, and 27 g/g or less or 25 g/g or less, when measured at 0.7 psi according to EDANA method WSP 241.3.

Since the super absorbent polymer particles in the super absorbent polymer layer have a property of absorbing moisture in the air, moisture in the air that would have otherwise penetrated the blanket may be absorbed in advance. In addition, the moisture that has already penetrated the blanket is also absorbed to the super absorbent polymer particles, such that the decrease in insulation performance of the composite insulating material may be minimized.

In order to describe the composite insulating material according to an exemplary embodiment of the present disclosure in detail, referring to FIGS. 1(a) and 1(b), the composite insulating material 1 may have a structure in which the super absorbent polymer layer 3 and the blanket 2 are alternately stacked. FIG. 1(a) illustrates the composite insulating material 1 in which one super absorbent polymer layer 3 is stacked between the blankets 2, and FIG. 1(b) illustrates the composite insulating material 1 in which two super absorbent polymer layers 3 are stacked with a structure in which the super absorbent polymer layer 3, the blanket 2, and the super absorbent polymer layer 3 are alternately stacked between the blankets 2 in this order. That is, one or more surfaces of the blanket 2 serving as an insulating material in the composite insulating material 1 may be in contact with the super absorbent polymer layer 3, and the super absorbent polymer particles included in the super absorbent polymer layer 3 have a property of absorbing up to 50 times their own weight in moisture. Therefore, the super absorbent polymer particles play an excellent role in minimizing moisture in the blanket 2, which is an insulating material. In addition, even when the super absorbent polymer particles absorb moisture, the thermal conductivity of the composite insulating material 1 may not decrease significantly due to the moisture absorption. That is, due to excellent absorption properties of the super absorbent polymer particles, an increase in thermal conductivity of the blanket 2 due to moisture may be suppressed, and a degree of increase in thermal conductivity by the absorbed super absorbent polymer layer 3 is not large, and therefore, the increase in thermal conductivity due to moisture of the composite insulating material 1 itself may be prevented, and thus excellent insulation performance may be maintained.

Referring to FIGS. 1(a) and 1(b), in the composite insulating material 1 of the present disclosure, the super absorbent polymer layer 3 may be located between the two or more blankets 2. The super absorbent polymer layer 3 may be a coating layer formed on the blanket 2, and may be a filling layer obtained by filling an air permeable receptor with super absorbent polymer particles. Specifically, the super absorbent polymer layer 3 according to an exemplary embodiment of the present disclosure may include an air permeable receptor and the super absorbent polymer particles filled in the air permeable receptor.

The coating layer may be formed by applying, onto the blanket 2, a coating solution prepared by stirring and mixing the super absorbent polymer particles with a dispersing solvent and a binder and drying the coating solution.

The filling layer may be formed by filling a separate air-permeable receptor with the super absorbent polymer particles, sealing the air permeable receptor, placing the air permeable receptor between the two or more blankets 2, and then performing pressing.

Specifically, the super absorbent polymer particles scatter like dust because they exist in the form of powder. Even when the super absorbent polymer layer 3 is applied as a coating layer together with a binder, as an adhesive force between some of the super absorbent polymer particles on the surface of the composite insulating layer weakens, the super absorbent polymer particles may be separated from each other and scatter, and therefore, it is preferable that the super absorbent polymer layer 3 is applied in the form of a filling layer.

Therefore, the air permeable receptor may have a mesh structure through which moisture and air pass without passing the super absorbent polymer particles. In this case, the air permeable receptor may include nylon, glass fiber/ polyethylene (PE), a non-woven fabric material, and a biodegradable material (for example, polylactic acid (PLA)).

According to an exemplary embodiment of the present disclosure, the air permeable receptor may include two or more suture lines intersecting with each other, and an accommodation part partitioned by the suture lines, and the super absorbent polymer particles may be accommodated in the accommodation part. The suture line is a line that crosses and sutures the air permeable receptor, and as the suture line is formed, the accommodation part, which is a space in which the super absorbent polymer particles may be accommodated, is formed. The accommodation part may have a shape of a plurality of squares or rectangles when the air permeable receptor is viewed in a plan view.

When the air permeable receptor is filled with the super absorbent polymer particles without the suture line and the accommodation part, a state in which the air permeable receptor is non-uniformly filled with the super absorbent polymer particles in the area of the air permeable receptor may occur. For example, when the plate-shaped composite insulating material is placed vertically and applied as an insulating material, the super absorbent polymer particles are densely concentrated downward due to gravity, and thus, a non-uniform distribution of the super absorbent polymer particles may occur. Therefore, a compartment of the accommodation part is formed through two or more suture lines intersecting with each other, and the accommodation part is filled with the super absorbent polymer particles, such that a state in which the super absorbent polymer particles are uniformly accommodated in the air permeable receptor may be achieved even when the composite insulating material is erected and applied vertically.

According to an exemplary embodiment of the present disclosure, a basis weight of the super absorbent polymer layer may be 0.08 to 0.31 g/cm², and more specifically, may be 0.15 to 0.25 g/cm². The basis weight refers to a ratio of the total mass of the super absorbent polymer particles included in the super absorbent polymer layer to the area of the super absorbent polymer layer. Therefore, when the super absorbent polymer particles are included in the super absorbent polymer layer with a mass within the above range according to the area of the super absorbent polymer layer, the absorbency of the super absorbent polymer layer may be maximized.

Specifically, when the basis weight is 0.08 g/cm² or more, the super absorbent polymer layer has an effect of properly absorbing moisture penetrating the blanket in the composite insulating material and moisture in the air to penetrate the blanket to reduce the humidity or moisture content of the composite insulating material itself. Through this, a decrease in insulation performance of the composite insulating material in a moisture atmosphere may be prevented.

When the basis weight is 0.31 g/cm² or less, for example, as the super absorbent polymer layer is formed with an excessive specific gravity or thickness, a decrease in insulation performance of the entire composite insulating material may be prevented.

Meanwhile, the super absorbent polymer particles included in the super absorbent polymer layer of the present disclosure swell when absorbing moisture. That is, the super absorbent polymer particles spaced apart from each other may swell while absorbing surrounding moisture and moisture penetrating the composite insulating material, thereby forming a protective film. The protective film may play a role in preventing penetration of moisture from the surface of the composite insulating material to a deeper inside. In addition, the protective film may also perform a buffering effect to prevent damage to the composite insulating material from external impact and may play a role in preventing moisture penetration due to damage to the blanket. For example, even when the blanket is damaged, excessive penetration of moisture into the blanket may be prevented by the protective film.

According to an exemplary embodiment of the present disclosure, a ratio of a thickness of the super absorbent polymer layer to the total thickness of two or more blankets may be 0.025 to 0.1. When the thickness ratio exceeds 0.1, as the super absorbent polymer layer excessively swells and becomes thick, the insulation effect of the composite insulating material may be reduced, and rather, the thermal conductivity may be lowered due to excessive moisture in the composite insulating material itself. In addition, when the thickness ratio is less than 0.025, due to a slightly thin super absorbent polymer layer, the effect of the super absorbent polymer layer to maintain the insulation effect of the composite insulating material by absorbing moisture that adversely affects the insulation of the blanket may be insignificant.

The ratio of the total thickness of the super absorbent polymer layer to the total thickness of the two or more blankets may refer to, for example, a ratio of the thickness of the super absorbent polymer layer with respect to the total sum of thicknesses of two blankets when one super absorbent polymer layer is located between the two blankets. In this case, the thickness may be measured by a vernier caliper.

Hereinafter, the present disclosure will be described in more detail by Examples. However, the following Examples are provided for illustrating the present disclosure. It is apparent to those skilled in the art that various modifications and alterations may be made without departing from the scope and spirit of the present disclosure, and the scope of the present disclosure is not limited thereto.

EXAMPLES

Example 1

(1) Production of Blanket

A silica sol was prepared by mixing tetraethyl orthosilicate (TEOS) and water at a molar ratio of 1:4 and adding TEOS and ethanol at a weight ratio of 1:5, and a base catalyst was added to the silica sol, thereby preparing a catalyzed sol.

Glass fibers as a substrate for a blanket were put into a reactor containing the catalyzed sol to impregnate the substrate for a blanket with silica sol. The substrate for blanket impregnated with the silica sol was allowed to stand at room temperature for 1 hour to gelate the silica sol to obtain a wet-gel fiber composite. The temperature was raised to 60° C., and then the wet-gel fiber composite was allowed to stand for 24 hours to be aged.

Thereafter, as a surface modifier, a solution obtained by diluting trimethylethoxysilane in ethanol (moisture content: 8 wt %) to 40 vol % was prepared. The surface modifier was put into a reactor, and a hydrophobic treatment was performed at 60° C. for 24 hours, thereby forming aerogel to which a hydrophobic functional group was applied on the inside and a surface of a substrate for a blanket.

Finally, drying was performed in an oven for 1 hour under conditions of 150° C. and atmospheric pressure to prepare a plate-shaped blanket having a thickness of 10 mm.

(2) Preparation of Super Absorbent Polymer Particles

In a 3 L glass vessel equipped with a stirrer and a thermometer, 100 g (1.388 mol) of acrylic acid, 0.26 g of polyethylene glycol diacrylate (PEGDA) as internal cross-linking agent, 0.008 g of diphenyl(2,4,6-trimethylbenzoyl) phosphine oxide as a photo-polymerization initiator, a polymerization initiator, 0.20 g of sodium persulfate as a thermal polymerization initiator, and 123.5 g of a 32% caustic soda (NaOH) solution were mixed with water at room temperature to obtain a solid content was 45.0 wt %, thereby preparing a composition.

Thereafter, the composition was fed onto a conveyor belt on which a belt having a width of 10 cm and a length of 2 m was rotated at a speed of 10 cm/min. At this time, a polymerization reaction was performed on the conveyor belt provided with a light source for 20 minutes, and through this, a hydrous gel polymer having a moisture content of 45 wt % was obtained.

Next, the hydrous gel polymer was pulverized into particles having a particle diameter of 300 μm to 5,000 μm using a meat chopper. Thereafter, the pulverized product was dried in hot air at 185° C. for 30 minutes using an air-flow oven. A base polymer was obtained through the pulverization, drying, and classification.

A surface crosslinking solution obtained by mixing water, methanol, and ethylene glycol diglycidyl ether as a surface crosslinking agent was added to 100 g of the base polymer, and then a surface crosslinking reaction was performed at 198° C. In addition, the resulting product was pulverized and classified to prepare super absorbent polymer particles having a particle diameter of 10 to 850 μm.

(3) Production of Super Absorbent Polymer Layer

A plate-shaped air permeable receptor having an area of 64 cm² (8 cm in length×8 cm in width) was filled with g of the super absorbent polymer particles prepared in the preparation of the super absorbent polymer particles, the air permeable receptor filled with the super absorbent polymer particles was leveled, and then the filled super absorbent polymer particles were uniformly distributed. Thereafter, the air permeable receptor was sutured with one suture line in a length direction and one suture line in a width direction so that these suture lines intersected each other, and four accommodation parts were partitioned. A super absorbent polymer layer having a basis weight of 0.16 g/cm² and a thickness of 1 mm was prepared in a state in which the super absorbent polymer particles were uniformly accommodated in the plurality of accommodation parts partitioned by the formation of the suture lines.

(4) Preparation of Composite Insulating Material

The super absorbent polymer layer was stacked on the plate-shaped blanket having a thickness of 10 mm and an area of 144 cm² (12 cm in length×12 cm in width) prepared in the preparation of the blanket. The same blanket as the blanket was stacked on the stacked super absorbent polymer layer, and then the blanket and the super absorbent polymer layer were bonded to each other by pressing. As described above, the super absorbent polymer layer having a thickness of 1 mm and a basis weight of 0.16 g/cm² was located between the two blankets. Therefore, a composite insulating material in which a ratio of the total thickness of the super absorbent polymer layer to the total thickness of the two blankets was 0.05 was prepared.

Example 2

A composite insulating material was prepared in the same manner as that of Example 1, except that the amount of the super absorbent polymer particles used that were filled in the super absorbent polymer layer was 20 g, and the basis weight of the super absorbent polymer layer was 0.31 g/cm².

Example 3

A composite insulating material was prepared in the same manner as that of Example 1, except that the plate-shaped air permeable receptor was filled with the super absorbent polymer particles, and then two suture lines intersecting with each other were not formed, that is, an additional accommodation part was not partitioned.

Example 4

A composite insulating material was prepared in the same manner as that of Example 1, except that the amount of the super absorbent polymer particles used that were filled in the super absorbent polymer layer was 3 g, and the basis weight of the super absorbent polymer layer was 0.05 g/cm².

Example 5

A composite insulating material was prepared in the same manner as that of Example 1, except that the amount of the super absorbent polymer particles used for that were filled in the super absorbent polymer layer was 25 g, and the basis weight of the super absorbent polymer layer was 0.39 g/cm².

COMPARATIVE EXAMPLES

Comparative Example 1

A composite insulating material was prepared in the same manner as that of Example 1, except that the super absorbent polymer layer was not used, and a single-layer blanket having a thickness of 20 mm was used.

EXPERIMENTAL EXAMPLES

The thermal conductivity was measured for the composite insulating materials prepared in Examples 1 to 5 and Comparative Example 1 by the following method. The results are shown in Table 1.

Samples of the composite insulating materials prepared in Examples 1 to 5 and Comparative Example 1 were prepared, and the weights of the samples were measured by AND WBA-6200 High-precision Balance (0.01 g to 6,200 g). In addition, the thermal conductivity at room temperature (23±5° C.) of the sample was measured using HFM 436 Lambda equipment available from NETZSCH.

Thereafter, the sample of the composite insulating material was put into a thermo-hygrostat to absorb moisture under conditions of a temperature of 80° C. and a humidity of 95%. The weight and thermal conductivity of the sample in the moisture-absorbed state were measured by the following methods.

As shown in Table 1, the thermal conductivity values of the composite insulating materials of Examples and Comparative Examples before moisture absorption were all the same, but it was confirmed that, after exposure to moisture absorption conditions, the thermal conductivity values of Experimental Examples 1 to 5 were low, and thus excellent insulation performance was maintained. Therefore, it could be confirmed that the insulation performance of the composite insulating material was maximized by the presence of the super absorbent polymer layer. In addition, it could be confirmed that the moisture penetrating the blanket in the composite insulating material was minimized through the moisture absorption properties of the super absorbent polymer layer.

In addition, the composite insulating material without the super absorbent polymer layer was subjected to moisture absorption under the same conditions in a thermo-hygrostat (Experimental Example 6) and the composite insulating material was immersed in a thermostat at 25° C. and fixed by placing a weight so that the composite insulating material did not float on the surface of the water (Experimental Example 7). the results of measuring the thermal conductivity as the insulation effect in Experimental Examples 6 and 7 in which the composite insulating materials prepared in Comparative Example 1 were used were exhibited. In Experimental Examples 6 and 7, the thermal conductivity values were increased by 44% and 196%, respectively, compared to those before moisture absorption. The insulation ability was significantly reduced compared to Experimental Example 1 in which the super absorbent polymer layer was present.

TABLE 1

| | Before moisture absorption | | | | After moisture absorption | | | |
|---|---|---|---|---|---|---|---|---|
| | Composite insulating material used | Composite insulating material (g) | Super absorbent polymer particles (g) | Thermal conductivity (mw/ m · K) | Moisture absorption conditions | Composite insulating material (g) | Super absorbent polymer particles (g) | Thermal conductivity (mw/ m · K) |
| Experimental Example 1 | Example 1 | 61.4 | 10 | 19.0 | 80° C. 95% | 61.5 | 17.8 | 19.1 |
| Experimental Example 2 | Example 2 | 61.3 | 20 | 19.0 | 80° C. 95% | 62.4 | 27.9 | 19.5 |
| Experimental Example 3 | Example 3 | 61.5 | 10 | 19.0 | 80° C. 95% | 61.6 g | 10.8 | 19.2 |
| Experimental Example 4 | Example 4 | 61.7 | 3 | 19.0 | 80° C. 95% | 62 | 10.9 | 22.3 |
| Experimental Example 5 | Example 5 | 61.3 | 25 | 19.0 | 80° C. 95% | 62.4 | 33.5 | 23.5 |
| Experimental Example 6 | Comparative Example 1 | 59.1 | — | 19.0 | 80° C. 95% | 63.0 | — | 27.4 |
| Experimental Example 7 | Comparative Example 1 | 59.1 | — | 19.0 | immersed in water | 71.7 | — | 56.3 |

The invention claimed is:

1. A composite insulating material comprising:

two or more blankets, wherein each blanket includes a substrate and aerogel formed inside and on a surface of the substrate; and a super absorbent polymer layer located between the two or more blankets, wherein the super absorbent polymer layer includes superabsorbent polymer particles.

2. The composite insulating material of claim 1, wherein the blanket and the super absorbent polymer layer are alternately stacked.

3. The composite insulating material of claim 1, wherein the super absorbent polymer layer includes an air permeable receptor, wherein the super absorbent polymer particles are filled in the air permeable receptor.

4. The composite insulating material of claim 3, wherein the air permeable receptor includes two or more suture lines intersecting with each other, and an accommodation part partitioned by the two or more suture lines, and the super absorbent polymer particles are accommodated in the accommodation part.

5. The composite insulating material of claim 1, wherein a basis weight of the super absorbent polymer layer is 0.08 to 0.31 g/cm$^2$, wherein the basis weight is a ratio of a total mass of the super absorbent polymer particles included in the super absorbent polymer layer to an area of the super absorbent polymer layer.

6. The composite insulating material of claim 1, wherein a ratio of a total thickness of the super absorbent polymer layer to a total thickness of the two or more blankets is from 0.025 to 0.1.

7. The composite insulating material of claim 1, wherein the aerogel has a surface including a hydrophobic functional group.

8. The composite insulating material of claim 1, wherein each of the super absorbent polymer particles comprises a crosslinked polymer of a water-soluble ethylenically unsaturated monomer having an acidic group of which at least a part is neutralized, and an internal crosslinking agent.

9. The composite insulating material of claim 8, wherein the water-soluble ethylenically unsaturated monomer includes (meth)acrylic acid or a salt thereof.

10. The composite insulating material of claim 1, wherein a particle diameter of each of the super absorbent polymer particles is from 10 to 850 μm.

*     *     *     *     *